United States Patent
Fujiwara et al.

(10) Patent No.: US 10,941,317 B2
(45) Date of Patent: Mar. 9, 2021

(54) ROOM-TEMPERATURE-CURABLE ORGANOPOLYSILOXANE COMPOSITION AND BASE MATERIAL

(71) Applicant: SHIN-ETSU CHEMICAL CO., LTD., Tokyo (JP)

(72) Inventors: Akitsugu Fujiwara, Annaka (JP); Tetsuro Yamada, Annaka (JP); Munenao Hirokami, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 0 days.

(21) Appl. No.: 16/500,989

(22) PCT Filed: Mar. 20, 2018

(86) PCT No.: PCT/JP2018/010930
§ 371 (c)(1),
(2) Date: Oct. 4, 2019

(87) PCT Pub. No.: WO2018/186167
PCT Pub. Date: Oct. 11, 2018

(65) Prior Publication Data
US 2020/0032103 A1 Jan. 30, 2020

(30) Foreign Application Priority Data
Apr. 7, 2017 (JP) .............................. JP2017-076512

(51) Int. Cl.
| C09D 183/08 | (2006.01) |
| C08G 77/392 | (2006.01) |
| C09D 183/14 | (2006.01) |
| C09D 5/16 | (2006.01) |

(52) U.S. Cl.
CPC .......... *C09D 183/14* (2013.01); *C08G 77/392* (2013.01); *C09D 5/1675* (2013.01); *C09D 183/08* (2013.01)

(58) Field of Classification Search
CPC ............................ C08G 77/392; C09D 183/08
See application file for complete search history.

(56) References Cited

U.S. PATENT DOCUMENTS

| 4,269,963 | A | 5/1981 | Homan et al. |
| 4,269,991 | A | 5/1981 | Homan et al. |
| 4,281,094 | A | 7/1981 | Homan et al. |
| 5,218,059 | A | 6/1993 | Kishihara et al. |
| 5,286,815 | A | 2/1994 | Leir et al. |
| 7,153,923 | B2 * | 12/2006 | Schindler ............... C08G 18/10 528/35 |
| 2005/0059789 | A1 | 3/2005 | Sakamoto et al. |

FOREIGN PATENT DOCUMENTS

| JP | 56-501604 A | 11/1981 |
| JP | 56-501650 A | 11/1981 |
| JP | 56-501682 A | 11/1981 |
| JP | 58-13673 A | 1/1983 |
| JP | 61-108665 A | 5/1986 |
| JP | 62-84166 A | 4/1987 |
| JP | 7-503748 A | 4/1995 |
| JP | 2503986 B2 | 6/1996 |
| JP | 2952375 B2 | 9/1999 |
| JP | 2003-147208 | * 5/2003 |
| JP | 2005-89560 A | 4/2005 |
| JP | 2006-160983 A | 6/2006 |
| JP | 2007-238820 A | 9/2007 |
| JP | 2009-185169 A | 8/2009 |
| JP | 2014-108950 A | 6/2014 |
| JP | 2017-203025 A | 11/2017 |

OTHER PUBLICATIONS

Machine translation of JP 2003-147208 into English (no date).*
International Search Report issued in PCT/JP2018/010930 (PCT/ISA/210), dated Jun. 26, 2018.
Written Opinion of the International Searching Authority issued in PCT/JP2018/010930 (PCT/ISA/237), dated Jun. 26, 2018.

* cited by examiner

*Primary Examiner* — Marc S Zimmer
(74) *Attorney, Agent, or Firm* — Birch, Stewart, Kolasch & Birch, LLP

(57) ABSTRACT

The present invention pertains to a room-temperature-curable organopolysiloxane composition containing (A) an organopolysiloxane having the hydrolyzable silyl-group-containing monovalent organic group represented by formula (1)

$$\cdots\left[\begin{array}{c}R^3\\|\\C\\|\\R^3\end{array}\right]_n\!\!\!-S-CH_2-\underset{\underset{R^2_{3-m}}{|}}{\overset{|}{Si}}-(OR^1)_m \quad (1)$$

($R^1$ represents a substituted or unsubstituted C1-10 alkyl group or a substituted or unsubstituted C6-10 aryl group, $R^2$ represents a substituted or unsubstituted C1-10 alkyl group or a substituted or unsubstituted C6-10 aryl group, and $R^3$ represents a substituted or unsubstituted C1-20 alkyl group or a hydrogen atom; M is an integer from 1 to 3, and n is an integer of 2 or more; and the broken line represents atomic bonding), (B) a hydrolyzable organosilane compound and/or a partially hydrolyzed condensate thereof, (C) a curing catalyst, and (F) a bleed oil. According to this configuration, an organotin-compound-free and MEKO-free product is achieved, exceptional fast-curing properties are achieved, and a cured coating film has exceptional rubber strength and exceptional antifouling performance over a long period of time.

8 Claims, No Drawings

ROOM-TEMPERATURE-CURABLE ORGANOPOLYSILOXANE COMPOSITION AND BASE MATERIAL

TECHNICAL FIELD

This invention relates to a room temperature-vulcanizable organopolysiloxane composition suitable as a coating material on substrates in underwater structures, ships or the like, and a substrate coated with a cured product of the composition.

BACKGROUND ART

Known in the art are a variety of room temperature-vulcanizable silicone rubber compositions which are crosslinked and cured into rubber elastomers (or cured silicone rubbers) by condensation in the presence of airborne moisture at room temperature (typically 25° C.±10° C.). Rubbers (i.e., silicone rubbers) resulting from such room temperature-vulcanizable silicone rubber compositions (referred to as "RTV silicone rubber compositions," hereinafter) have improved weather resistance, durability, heat resistance, and freeze resistance as compared with other hydrocarbon organic rubbers and are thus used in a wide variety of fields. Especially in the building field, RTV silicone rubber compositions are often used for the bonding of glass plates, the bonding of metal and glass, the sealing of concrete joints, and the like. Recently, RTV silicone rubber compositions find wide use as coating materials for buildings, plants, water conduits (inclusive of inner and outer surfaces) and the like. In the electrical and electronic field, RTV silicone rubber compositions are used as coating materials for liquid crystal peripheral parts and power supply circuit boards which show a rapidly increasing demand in recent years.

Once underwater structures are installed or put in commission, aquatic organisms living in waters like sea and rivers such as barnacle, oyster, ascidian, serpula, mussel, cockscomb pearl mussel, Bugula neritina, Enteromorpha, and Ulva deposit and grow on splashed and submerged surface areas, causing various damages. In the case of a ship, for example, the deposition of organisms to the hull increases frictional resistance to water to reduce the sailing speed. The fuel consumption must be increased in order to maintain a certain speed, which is uneconomical. When aquatic organisms deposit on structures of a harbor facility which are held at or below the water surface, it becomes difficult for the structures to exert their own function and sometimes, their substrates can be eroded. When aquatic organisms deposit on fish culture nets or fixed shore nets, net openings are closed, eventually leading to the death of fishes.

Traditional means for preventing deposition and growth of aquatic organisms on underwater structures is the application to such structures of antifouling paints having incorporated therein toxic antifouling agents such as organotin compounds and cuprous oxide. Although such antifouling paints are effective for substantially preventing deposition and growth of aquatic organisms, the use of toxic antifouling agents is harmful to the environmental safety and hygiene during preparation and application of paints. Additionally, the toxic antifouling agent is slowly leached out of the coating in water, with the risk of pollution of the surrounding water area over a long term. For this reason, the use of toxic antifouling agents was legally banned.

There have been proposed paint compositions which are effective for preventing deposition and growth of aquatic organisms, but free of toxic antifouling agents. Paint compositions which are designed to impart antifouling property by reducing the surface tension of coatings include non-toxic antifouling paint compositions comprising RTV silicone rubber compositions and liquid paraffin or petrolatum (see JP-A 58-13673: Patent Document 1 and JP-A 62-84166: Patent Document 2). Japanese Patent No. 2,503,986: Patent Document 3 and Japanese Patent No. 2,952,375: Patent Document 4 disclose non-toxic antifouling paint compositions comprising a reaction curable silicone resin and a less compatible, non-reactive, polar group-containing silicone resin wherein under the impetus of volume shrinkage associated with curing of the reaction curable silicone resin, the polar group-containing silicone resin bleeds out of the surface, which cooperates with the low surface tension of reaction curable silicone resin, to exhibit antifouling property. These non-toxic antifouling paint compositions, however, suffer from environmental safety and hygiene problems because the less compatible, non-reactive, polar group-containing silicone resin serving as bleed oil is a polyoxyethylene group-containing silicone resin in which ethylene oxide or propylene oxide is added to a silicon atom via a C—C bond or a silicone resin having an alkoxy group bonded to a silicon atom at a molecular end via an ethylene oxide or propylene oxide group.

Most of RTV silicone rubber compositions in conventional antifouling paint compositions are moisture cure type, and the majority of moisture cure type RTV silicone rubber compositions are oxime cure type. This is because oxime cure type compositions show good curability even without using hazardous organotin compounds and cure into coatings with high strength. However, since oxime cure type compositions generate methyl ethyl ketoxime (MEKO) during curing which becomes a matter of concern as environmental load, they are often avoided mainly in the European antifouling paint market. Alcohol cure type compositions can be MEKO-free, but generally require organotin as the curing catalyst. Additionally, since the alcohol cure type compositions cure at a slow rate as compared with the oxime cure type compositions, antifouling paints comprising the alcohol cure type compositions may be less efficient in operation.

Therefore, there is a worldwide need for RTV silicone rubber compositions which are MEKO-free and organotin-free and successfully used as a fast-curable antifouling paint.

PRIOR ART DOCUMENTS

Patent Documents

Patent Document 1: JP-A S58-013673
Patent Document 2: JP-A S62-084166
Patent Document 3: JP 2503986
Patent Document 4: JP 2952375

SUMMARY OF INVENTION

Technical Problem

An object of the invention, which has been made under the above-mentioned circumstances, is to provide a room temperature-vulcanizable (RTV) organopolysiloxane composition which does not contain organotin compounds that are harmful to the environmental safety and hygiene and MEKO that is often avoided in the antifouling paint market, but has good curability and forms a cured coating that has excellent rubber strength and can exert excellent antifouling performance over a long term, and a substrate coated with a cured product of the composition.

Solution to Problem

Making extensive investigations to attain the above object, the inventors have found that a RTV organopolysiloxane composition of dealcoholization type which is free of MEKO and organotin compounds is prepared by using an organopolysiloxane having, at the end of the molecular chain, a hydrolyzable silyl-containing monovalent organic group which has a sulfur atom (i.e., thioether bond) at β-position of the silicon atom on the hydrolyzable silyl group, as the main component or base polymer and combining it with a hydrolyzable (organo)silane compound and/or partial hydrolytic condensate thereof (i.e., hydrolyzable siloxane oligomer) as a crosslinker or curing agent, and that the composition is fast curable and storage stable and, when blended with a specific bleed oil, forms a cured coating which has excellent rubber strength and surface smoothness and can exert excellent antifouling performance over a long term. The invention is predicated on this finding.

Accordingly, the invention provides a RTV organopolysiloxane composition and a substrate coated with the cured composition, as defined below.

[1]

A room temperature vulcanizable organopolysiloxane composition comprising the following components (A), (B), (C) and (F):

(A) 100 parts by weight of an organopolysiloxane having, at the end of the molecular chain, a hydrolyzable silyl-containing monovalent organic group represented by the general formula (1):

[Chem. 1]

$$\text{---}\left[\begin{array}{c}R^3\\|\\C\\|\\R^3\end{array}\right]_n\text{---}S\text{---}CH_2\text{---}\underset{\underset{R^2_{3-m}}{|}}{Si}\text{---}(OR^1)_m \quad (1)$$

wherein $R^1$ is each independently a substituted or unsubstituted $C_1$-$C_{10}$ alkyl group or a substituted or unsubstituted $C_6$-$C_{10}$ aryl group, $R^2$ is each independently a substituted or unsubstituted $C_1$-$C_{10}$ alkyl group or a substituted or unsubstituted $C_6$-$C_{10}$ aryl group, $R^3$ which may be the same or different is a substituted or unsubstituted $C_1$-$C_{20}$ alkyl group or hydrogen, m is an integer of 1 to 3, n is an integer of at least 2, and the broken line represents a valence bond, (B) 0.1 to 30 parts by weight of a hydrolyzable (organo) silane compound having the general formula (2) and/or a partial hydrolytic condensate thereof,

[Chem. 2]

$$R^5_{(4-a)}SiX_a \quad (2)$$

wherein $R^5$ is a halo-substituted or unsubstituted $C_1$-$C_{10}$ monovalent hydrocarbon group, X is a hydrolyzable group, and a is 3 or 4, (C) 0.001 to 10 parts by weight of a curing catalyst, and
(F) 0.01 to 100 parts by weight of a bleed oil.

[2]

The room temperature vulcanizable organopolysiloxane composition of [1] wherein component (A) has the structural formula (3):

[Chem. 3]

$$(R^1O)_m\text{---}\underset{\underset{R^2_{3-m}}{|}}{Si}\text{---}CH_2\text{---}S\text{---}[\text{---}CH_2\text{---}]_n Z[\text{---}CH_2\text{---}]_n S\text{---}CH_2\text{---}\underset{\underset{R^2_{3-m}}{|}}{Si}\text{---}(OR^1)_m \quad (3)$$

wherein $R^1$, $R^2$, m and n are as defined above and Z is an organopolysiloxane skeleton of linear, branched, cyclic and/or crosslinked structure as the backbone.

[3]

The room temperature vulcanizable organopolysiloxane composition of [1] or [2] wherein component (A) has a viscosity $\mu_{(A)}$ of 100 to 100,000 mPa·s at 25° C.

[4]

The room temperature vulcanizable organopolysiloxane composition of any one of [1] to [3] wherein component (F) has a viscosity $\mu_{(F)}$ of 20 to 30,000 mPa·s at 25° C.

[5]

The room temperature vulcanizable organopolysiloxane composition of any one of [1] to [4] wherein a ratio of the viscosity at 25° C. of component (F) to the viscosity at 25° C. of component (A), that is, $\mu_{(F)}/\mu_{(A)}$ is from 0.05 to 1.0.

[6]

The room temperature vulcanizable organopolysiloxane composition of any one of [1] to [5], further comprising at least one component selected from (D) 1 to 100 parts by weight of a filler and
(F) 0.1 to 10 parts by weight of an adhesion promoter.

[7]

A substrate which is coated with a cured product of the room temperature vulcanizable organopolysiloxane composition of any one of [1] to [6].

[8]

The substrate of [7] which is an underwater structure.

Advantageous Effects of Invention

Even though organotin compounds which are effective curing catalysts, but harmful to the environmental safety and hygiene and MEKO which is often avoided in the antifouling paint market are omitted, the RTV organopolysiloxane composition of the invention has good curability, forms a cured coating having excellent rubber strength, and can exert excellent antifouling performance over a long term when used as antifouling paint. Especially, when the composition is coated to an underwater structure, the coating is effective in preventing aquatic organisms from depositing or growing on the surface of the underwater structure and sustains the effect over time.

That is, the coating of the RTV organopolysiloxane composition is non-toxic and exhibits the antifouling effect of preventing deposition and growth of aquatic organisms over a long term when it is applied to underwater structures. Therefore the composition is highly suited in applications as coating materials requiring water resistance such as ship bottom paint, power plant sea water inlet pipe paint, and fishnet paint, moisture-proof coating materials requiring moisture resistance as used for LCD and PDP, adhesive seals between conductor and resin coating, adhesive seals between a resin case or connector and conductor, adhesive seals in vacuum or pressure chambers, and the like. Particularly when used as ship bottom paint, power plant sea water inlet pipe paint, and fishnet paint, the composition is effective for preventing deposition and growth of aquatic organisms on the corresponding surface.

DESCRIPTION OF EMBODIMENTS

Now the invention is described in detail.
<RTV Organopolysiloxane Composition>
The invention provides a RTV organopolysiloxane composition comprising at least the following components (A), (B), (C) and (F).
Component (A):
Component (A) is an organopolysiloxane, preferably linear organopolysiloxane which has a hydrolyzable silyl-containing monovalent organic group of the following general formula (1) at the end of the molecular chain (preferably both ends of the molecular chain), the monovalent organic group having a sulfur atom (i.e., thioether bond) at β-position of the silicon atom on the hydrolyzable silyl group. Component (A) serves as the main component or base polymer of the composition.

Using the organopolysiloxane having a hydrolyzable silyl-containing monovalent organic group of formula (1) at the end of the molecular chain as the main component or base polymer, the monovalent organic group having a sulfur atom (i.e., thioether bond) at β-position of the silicon atom on the hydrolyzable silyl group, there is obtained a RTV organopolysiloxane composition (or RTV silicone rubber composition) which is fast curable and also storage stable and forms a cured product having durability. Component (A) may be synthesized by thiol-ene reaction of an ordinary organopolysiloxane having an alkenyl group such as terminal vinyl with a hydrolyzable silane (e.g., alkoxysilane) having a thiol group.

[Chem. 4]

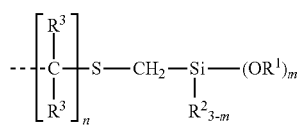

(1)

Herein $R^1$ is each independently a substituted or unsubstituted $C_1$-$C_{10}$ alkyl group or a substituted or unsubstituted $C_6$-$C_{10}$ aryl group, $R^2$ is each independently a substituted or unsubstituted $C_1$-$C_{10}$ alkyl group or a substituted or unsubstituted $C_6$-$C_{10}$ aryl group, $R^3$ which may be the same or different is a substituted or unsubstituted $C_1$-$C_{20}$ alkyl group or hydrogen, m is an integer of 1 to 3, n is an integer of at least 2, and the broken line represents a valence bond.

Examples of $R^1$ and $R^2$ include alkyl groups such as methyl, ethyl, n-propyl, isopropyl, n-butyl, isobutyl, sec-butyl, tert-butyl, pentyl, neopentyl, hexyl, heptyl, octyl, 2-ethylhexyl, nonyl, and decyl; cycloalkyl groups such as cyclopentyl and cyclohexyl; aryl groups such as phenyl, tolyl, xylyl, and α-, β-naphthyl; and substituted forms of the foregoing groups in which some or all of the hydrogen atoms are substituted by halogen atoms such as F, Cl and Br, cyano or the like, such as 3-chloropropyl, 3,3,3-trifluoropropyl, and 2-cyanoethyl. Additional examples of $R^1$ include substituted forms of the foregoing alkyl groups in which some of the hydrogen atoms are substituted by lower alkoxy groups, for example, alkoxy-substituted alkyl groups such as methoxymethyl, methoxyethyl, ethoxymethyl, and ethoxyethyl.

Of these, $R^1$ and $R^2$ are preferably selected from methyl, ethyl, and phenyl, with methyl being more preferred in view of curability, availability, productivity, and cost.

$R^3$ which may be the same or different is a substituted or unsubstituted $C_1$-$C_{20}$ alkyl group or hydrogen. The substituted or unsubstituted alkyl groups of $R^3$ preferably have about 1 to about 10 carbon atoms, more preferably about 1 to about 3 carbon atoms and may be the same or different.

Examples of $R^3$ include hydrogen and substituted or unsubstituted alkyl groups as exemplified above for the alkyl groups of $R^1$ and $R^2$.

Of these, $R^3$ is preferably hydrogen or methyl, with hydrogen being more preferred in view of curability, availability, productivity, and cost.

In formula (1), m is an integer of 1 to 3. In view of reactivity, m is preferably 2 or 3, most preferably 3. Also, n is an integer of at least 2. In view of reactivity, n is preferably an integer of 2 to 10, more preferably 2 to 6, even more preferably 2 or 3, and most preferably 2.

The organopolysiloxane as component (A) has per molecule at least one hydrolyzable silyl-containing monovalent organic group of structural formula (1) at the end of the molecular chain. If the number per molecule of hydrolyzable silyl-containing monovalent organic group of formula (1) is less than 1 on the average, a composition becomes less curable or its cured product has insufficient mechanical properties. On the contrary, if the number of hydrolyzable silyl-containing monovalent organic groups is too much, the crosslinking density becomes so high that the cured product may not exhibit desired mechanical properties, or the storage stability of the composition may be exacerbated. For this reason, the number per molecule of hydrolyzable silyl-containing monovalent organic groups is at least 1, preferably 1 to 6, more preferably 2 to 4, even more preferably 2 or 3, and most preferably 2.

The average value (i.e., number average value) of hydrolyzable silyl-containing monovalent organic groups based on overall component (A) is 1.1 to 4, preferably 1.5 to 3, and most preferably 2.

Therefore, the organopolysiloxane (A) is preferably an organopolysiloxane compound having the following general formula (3) which contains hydrolyzable silyl-containing monovalent organic groups at both ends of the molecular chain, the organic group having a sulfur atom (i.e., thioether bond) at β-position of the silicon atom on the hydrolyzable silyl group, and has an organopolysiloxane skeleton of linear, branched, cyclic and/or crosslinked structure in the backbone. The use of the relevant compound leads to further improvements in the mechanical properties of a cured product and the storage stability of a composition.

[Chem. 5]

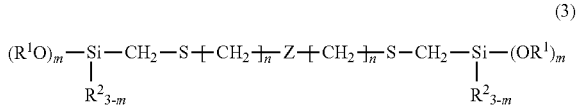

(3)

Herein $R^1$, $R^2$, m and n are as defined above and Z is an organopolysiloxane skeleton of linear, branched, cyclic and/or crosslinked structure as the backbone.

In formula (3), Z is an organopolysiloxane skeleton of linear structure, branched structure (i.e., structure composed of difunctional diorganosiloxane units as the main constituent unit and some trifunctional organosilsesquioxane units), cyclic structure and/or crosslinked structure (i.e., hyperbranched structure composed of trifunctional organosilsesquioxane units and/or $SiO_2$ units as the main constituent unit) as the backbone. Z is not particularly limited as long as it has a backbone skeleton composed of an organopolysiloxane. Z may have a linear, branched, cyclic and/or crosslinked structure in the backbone skeleton.

Of these, Z is preferably a diorganopolysiloxane skeleton of linear structure (i.e., linear diorganopolysiloxane structure consisting of repeating difunctional diorganosiloxane units), in view of mechanical properties of a cured product and storage stability of a composition.

The organopolysiloxane (A) is preferably one of formula (3) wherein Z has a linear diorganopolysiloxane skeleton composed of repeating units having the structural formula (4) shown below. The use of such an organopolysiloxane compound leads to further improvements in the mechanical properties of a cured product and the storage stability of a composition.

[Chem. 6]

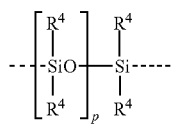

(4)

Herein $R^4$ is each independently a substituted or unsubstituted $C_1$-$C_{10}$ alkyl group or a substituted or unsubstituted $C_6$-$C_{10}$ aryl group, p is a number of at least 1, and the broken line represents a valence bond.

$R^4$ which may be the same or different is a substituted or unsubstituted alkyl group or substituted or unsubstituted aryl group. The substituted or unsubstituted alkyl groups of $R^4$ preferably have about 1 to about 10 carbon atoms, more preferably about 1 to about 3 carbon atoms and may be the same or different. The substituted or unsubstituted aryl groups of $R^4$ preferably have about 6 to about 10 carbon atoms and may be the same or different.

Examples of $R^4$ are as exemplified above for $R^1$ and

Of these, $R^4$ is preferably methyl or phenyl, with methyl being more preferred in view of curability and yellowing resistance.

In formula (4), p is a number of at least 1. In view of mechanical properties of a cured product and workability of a composition, p is preferably a number of 10 to 2,000, more preferably 50 to 1,500, and even more preferably 100 to 1,000.

The number average molecular weight (Mn) of the organopolysiloxane (A) is not particularly limited. From the aspects of adjusting the viscosity of a curable composition containing the relevant compound to an appropriate range for efficient working and of imparting sufficient curability, the Mn is preferably 800 to 100,000, more preferably 2,000 to 50,000, and even more preferably 5,000 to 20,000. As used herein, the Mn is measured by gel permeation chromatography (GPC) versus polystyrene standards using toluene as developing solvent, and the number of repeating diorganosiloxane units in formula (4) (or number average degree of polymerization represented by p) is calculated therefrom.

The viscosity $\mu_{(A)}$ of component (A) is not particularly limited. From the aspects of adjusting the viscosity of a curable composition containing the relevant compound to an appropriate range for efficient working and of imparting sufficient curability, the viscosity $\mu_{(A)}$ is preferably 100 to 100,000 mPa·s, more preferably 300 to 50,000 mPa·s, and even more preferably 500 to 20,000 mPa·s. As used herein, the viscosity is measured at 25° C. by a Brookfield rotational viscometer, for example, BL, BH or BS type viscometer (the same holds true, hereinafter).

Component (A) may be obtained by reacting a silicon-containing compound having at least one alkenyl group per molecule with a compound having mercapto and alkoxysilyl groups represented by the formula (5), the latter compound being referred to as mercaptosilane, hereinafter.

More specifically, a thiol-ene reaction is conducted between the alkenyl group on the silicon-containing compound and the mercapto group on the mercaptosilane.

[Chem. 7]

(5)

Herein $R^1$, $R^2$, and m are as defined above.

Examples of the mercaptosilane having formula (5) include mercaptomethyltrimethoxysilane, mercaptomethyldimethoxymethylsilane, mercaptomethylmethoxydimethylsilane, mercaptomethyltriethoxysilane, mercaptomethyldiethoxymethylsilane, and mercaptomethylethoxydimethylsilane. Of these, mercaptomethyltrimethoxysilane, mercaptomethyldimethoxymethylsilane, and mercaptomethyltriethoxysilane are preferred in view of hydrolysis, with mercaptomethyltrimethoxysilane being more preferred.

The silicon-containing compound having at least one alkenyl group per molecule is not particularly limited as long as it has a backbone skeleton composed of a silicon-containing organic group (or polysiloxane skeleton). The backbone skeleton may have a linear, branched or crosslinked structure.

Examples include vinylpentamethyldisiloxane, 1,1-divinyltetramethyldisiloxane, 1,1,1-trivinyltrimethyldisiloxane, 1,3-divinyltetramethyldisiloxane, 1,3-divinyltetraphenyldisiloxane, 1,3-diallyltetramethyldisiloxane, 1,1,3,3-tetravinyldimethyldisiloxane, hexavinyldisiloxane, 1,3,5,7-tetravinyltetramethylcyclotetrasiloxane, molecular both end vinyldimethylsiloxy-capped dimethylpolysiloxane, molecular both end divinylmethylsiloxy-capped dimethylpolysiloxane, molecular both end trivinylsiloxy-capped dimethylpolysiloxane, molecular both end vinyldiphenylsiloxy-capped diphenylpolysiloxane, molecular both end vinyldiphenylsiloxy-capped phenylmethylpolysiloxane, molecular both end vinyldimethylsiloxy-capped dimethylsiloxane/diphenylsiloxane copolymers, molecular both end vinyldimethylsiloxy-capped dimethylsiloxane/phenylmethylsiloxane copolymers, molecular both end vinyldiphenylsiloxy-capped dimethylsiloxane/diphenylsiloxane copolymers, molecular both end vinyldiphenylsiloxy-capped dimethylsiloxane/phenylmethylsiloxane copolymers, terminal vinyl-containing methyl-based silicone resins (for example, three-dimensional network copolymers composed of vinyldimethylsiloxy units/$SiO_2$ units, three-dimensional network copolymers composed of vinyldimethylsiloxy units/vinylsilsesquioxane units/$SiO_2$ units, three-dimensional network copolymers composed of trimethylsiloxy units/vinylsilsesquioxane units/$SiO_2$ units, and three-dimensional network copolymers composed of vinyldimethylsiloxy units/dimethyl siloxane units/$SiO_2$ units), terminal vinyl-containing phenyl-based silicone resins (for example, three-dimensional network copolymers composed of vinyldiphenylsiloxy units/$SiO_2$ units, three-dimensional network copolymers composed of vinyldiphenylsiloxy units/vinyl-silsesquioxane units/SiO$_2$ units, and three-dimensional network copolymers composed of vinyldiphenylsiloxy units/diphenylvinylsiloxy units/SiO$_2$ units), and terminal vinyl-containing methyl/phenyl-based silicone resins (for example, three-dimensional network copolymers composed of vinyldimethylsiloxy units/diphenylsiloxane units/SiO$_2$ units, three-dimensional network copolymers composed of vinyldimethylsiloxy units/phenylmethylsiloxane units/SiO$_2$ units, and three-dimensional network copolymers composed of vinyldiphenylsiloxy units/dimethyl siloxane units/SiO$_2$ units).

Of these, compounds of linear structure are preferred in view of mechanical properties of a cured product and storage stability of a composition.

Therefore, the silicon-containing compound having at least one alkenyl group per molecule is preferably an organopolysiloxane compound having alkenyl groups at both ends of the molecular chain, represented by the structural formula (6) below. The use of such an organopolysiloxane compound leads to further improvements in mechanical properties of a cured product and storage stability of a composition.

[Chem. 8]

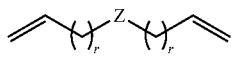

(6)

In formula (6), Z is as defined above. Preferably Z is a linear diorganopolysiloxane structure of formula (4). The incorporation of such a structure leads to further improvements in mechanical properties of a cured product and storage stability of a composition. In formula (6), r is an integer of at least 0. In view of reactivity, r is preferably an integer of 0 to 8, more preferably 0 to 4, even more preferably 0 or 1, and most preferably 0.

The number average molecular weight (Mn) of the silicon-containing compound having at least one alkenyl group per molecule is not particularly limited. From the aspects of adjusting the viscosity of a curable composition containing the relevant compound to an appropriate range for efficient working and of imparting sufficient curability, the Mn is preferably 500 to 100,000, more preferably 1,500 to 50,000, and even more preferably 4,000 to 20,000.

Exemplary of the silicon-containing compound having formula (6) (i.e., organopolysiloxane compound capped with alkenyl groups at both ends of the molecular chain) is a dimethylpolysiloxane capped with vinyldimethylsiloxy groups at both ends of the molecular chain as represented by the following structural formula. Examples are not limited thereto.

[Chem. 9]

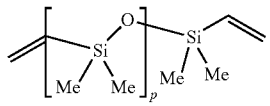

Herein Me is methyl and p is as defined above.

From the aspects of suppressing formation of by-products during thiol-ene reaction and enhancing storage stability and properties of the resulting organosilicon compound, the silicon-containing compound having formula (6) and the mercaptosilane having formula (5) are preferably combined such that 0.8 to 1.5 moles, more preferably 0.9 to 1.2 moles of mercapto groups on the mercaptosilane of formula (5) are available per mole of alkenyl groups on the silicon-containing compound.

During the thiol-ene reaction, a catalyst may be used for enhancing the reaction rate although the catalyst need not be used.

The catalyst may be selected from those commonly used in thiol-ene reaction, but not limited thereto. Preference is given to radical polymerization initiators capable of generating radicals by heat, light or redox reaction.

Suitable catalysts include organic peroxides such as aqueous hydrogen peroxide, tert-butyl hydroperoxide, di-tert-butyl peroxide, (2-ethylhexanoyl)(tert-butyl) peroxide, benzoyl peroxide, cumene hydroperoxide, and dicumyl peroxide; azo compounds such as 2,2'-azobispropane, 2,2'-azobisisobutane, 2,2'-azobisisobutyronitrile, 2,2'-azobis-2-methylbutyronitrile, 2,2'-azobis-2-methylvaleronitrile, 2,2'-azobis-2,4-dimethylvaleronitrile, methyl 2,2'-azobis-2-methylpropionate, 2,2'-dichloro-2,2'-azobispropane, 2,2'-dichloro-2,2'-azobisbutane, 1,1'-azo(methylethyl)diacetate, 2,2'-azobisisobutylamide, dimethyl 2,2'-azobisisobutyrate, 3,5-dihydroxymethylphenylazo-2-methylmalonodinitrile, and dimethyl 4,4'-azobis-4-cyanovalerate; redox initiators such as hydrogen peroxide-iron(II) salt, cerium(IV) salt-alcohol, and organic peroxide-dimethylaniline; photopolymerization initiators such as 2-benzyl-2-dimethylamino-1-(4-morpholinophenyl)-1-butanone, 2-methyl-1-[4-(methylthio)phenyl]-2-morpholinopropan-1-one, 2-dimethylamino-2-(4-methylbenzyl)-1-(4-morpholin-4-ylphenyl)butan-1-one, 1-hydroxycyclohexyl phenyl ketone, 2-hydroxy-2-methyl-1-phenylpropan-1-one, 2,2-dimethoxy-1,2-diphenylethan-1-one, 1-[4-(2-hydroxyethoxy)-phenyl]-2-hydroxy-2-methyl-1-propan-1-one, 2-hydroxy-1-{4-[4-(2-hydroxy-2-methylpropionyl)benzyl]phenyl}-2-methylpropan-1-one, 2,4,6-trimethylbenzoyl-diphenylphosphine oxide, bis(2,4,6-trimethylbenzoyl) phenylphosphine oxide, and bis(2,6-dimethoxybenzoyl)-2,4,4-trimethylpentylphosphine oxide; and dialkyl disulfides such as tetraalkylthiuram disulfides. These compounds may be used alone or in admixture.

Of these, (2-ethylhexanoyl)(tert-butyl) peroxide and 2,2'-azobis-2-methylbutyronitrile are preferred from the standpoint of reaction rate during thiol-ene reaction, with 2,2'-azobis-2-methylbutyronitrile being more preferred.

The catalyst may be used in a catalytic amount. Typically the amount is 0.001 to 10% by weight based on the total of the silicon-containing compound capped with alkenyl at the molecular chain end and the mercaptosilane of formula (5).

Although the thiol-ene reaction takes place in a solventless system, a solvent which is not detrimental to the reaction may be used.

Suitable solvents include hydrocarbon solvents such as pentane, hexane, heptane, octane, decane, and cyclohexane; aromatic solvents such as benzene, toluene, and xylene; amide solvents such as formamide, N,N-dimethylformamide, pyrrolidone, and N-methylpyrrolidone; and ester solvents such as ethyl acetate, butyl acetate, γ-butyrolactone, and propylene glycol-1-monomethylether-2-acetate. They may be used alone or in admixture.

Although the temperature of thiol-ene reaction is not particularly limited, a temperature of 25 to 150° C., especially 40 to 100° C. is preferred for adjusting the reaction rate appropriate and controlling side reactions.

The reaction time is typically 10 minutes to 24 hours though not particularly limited.

Component (B):

Component (B) is a hydrolyzable (organo)silane compound having the following general formula (2) and/or partial hydrolytic condensate thereof (i.e., (organo)siloxane oligomer which is formed by partial hydrolytic condensation of the (organo)silane compound and has at least 2, preferably at least 3 residual hydrolyzable groups per molecule), and serves as a curing agent in the composition. Notably, component (B) is definitely discriminated from component (A) in that it does not contain any hydrolyzable silyl-containing monovalent organic group of the general formula (1) in the molecule.

[Chem. 10]

$$R^5_{(4-a)}SiX_a \quad (2)$$

Herein $R^5$ is a halo-substituted or unsubstituted $C_1$-$C_{10}$ monovalent hydrocarbon group, X is a hydrolyzable group, and a is 3 or 4.

In formula (2), $R^5$ is a halo-substituted or unsubstituted $C_1$-$C_{10}$ monovalent hydrocarbon group, examples of which include alkyl groups such as methyl, ethyl, n-propyl, isopropyl, n-butyl, isobutyl, sec-butyl, tert-butyl, pentyl, neopentyl, hexyl, heptyl, octyl, 2-ethylhexyl, nonyl, and decyl; cycloalkyl groups such as cyclopentyl and cyclohexyl; alkenyl groups such as vinyl, allyl, propenyl, isopropenyl, butenyl, isobutenyl, heptenyl, hexenyl, and cyclohexenyl; aryl groups such as phenyl, tolyl, xylyl, and α-, β-naphthyl; aralkyl groups such as benzyl, 2-phenylethyl, and 3-phenylpropyl; and substituted forms of the foregoing groups in which some of the hydrogen atoms are substituted by halogen atoms, such as 3,3,3-trifluoropropyl. Of these, methyl, ethyl and vinyl are preferred, with methyl and vinyl being more preferred. The subscript a is an integer of 3 or 4.

X is a hydrolyzable group, examples of which include $C_1$-$C_4$, specifically $C_1$ or $C_2$ alkoxy groups such as methoxy, ethoxy, propoxy, and butoxy, $C_2$-$C_4$ alkoxy-substituted alkoxy groups such as methoxymethoxy, methoxyethoxy, ethoxymethoxy, and ethoxyethoxy, aryloxy groups such as phenyloxy, ketoxime groups such as ethylmethylketoxime, $C_2$-$C_4$ alkenyloxy groups such as isopropenoxy, acyloxy groups such as acetoxy, and dialkylaminoxy groups such as dimethylaminoxy. Of these, alkoxy and alkenyloxy groups are preferred with alkoxy being most preferred.

Examples of the curing agent include ketoximesilanes such as methyltris(dimethylketoxime)silane, methyltris(methylethylketoxime)silane, ethyltris(methylethylketoxime)silane, methyltris(methylisobutylketoxime)silane, vinyltris(methylethylketoxime)silane, and phenyltris(methylethylketoxime)silane, alkoxysilanes such as methyltrimethoxysilane, vinyltrimethoxysilane, phenyltrimethoxysilane methyltriethoxysilane, tetramethoxysilane, and tetraethoxysilane, isopropenoxy-containing silanes such as methyltri(isopropenoxy)silane, ethyltri(isopropenoxy)silane, vinyltri(isopropenoxy)silane, and phenyltri(isopropenoxy)silane, acetoxysilanes such as methyltriacetoxysilane, ethyltriacetoxysilane, and vinyltriacetoxysilane, and partial hydrolytic condensates of these silanes (i.e., organosiloxane oligomer which is formed by partial hydrolytic condensation of the hydrolyzable silane compound and has at least 2, preferably at least 3 residual hydrolyzable groups per molecule). The curing agents may be used alone or in admixture.

The amount of the curing agent (i.e., (B) hydrolyzable (organo)silane compound and/or partial hydrolytic condensate thereof) blended is preferably 0.1 to 30 parts, more preferably 0.5 to 20 parts, and even more preferably 1 to 15 parts by weight per 100 parts by weight of component (A). If the amount of component (B) is less than 0.1 part, crosslinking is insufficient, failing to obtain a composition with the desired rubber elasticity. If the amount is more than 30 parts, there arise problems that the mechanical properties of a cured product can be exacerbated and the cure rate is decelerated.

Component (C):

Component (C) is a catalyst which is used for promoting hydrolytic condensation of the composition with airborne moisture and commonly referred to as "curing catalyst." The curing catalyst may be any of well-known ones used in conventional RTV silicone resin compositions which cure in the presence of humidity. It is noted that organotin compounds are excluded because they are harmful to the environmental safety.

Examples of the curing catalyst (C) include titanates and titanium chelate compounds such as tetraisopropoxytitanium, tetra-n-butoxytitanium, tetrakis(2-ethylhexoxy)titanium, titanium isopropoxybis(ethylacetoacetate), isopropoxybis(acetylacetonato)titanium, and titanium isopropoxyoctylene glycol; phosphazene-containing compounds such as N,N,N',N',N'',N''-hexamethyl-N'''-(trimethylsilylmethyl)-phosphorimidic triamide; aminoalkyl-substituted alkoxysilanes such as 3-aminopropyltriethoxysilane and N-β-(aminoethyl)-γ-aminopropyltrimethoxysilane; amine compounds and salts thereof such as hexylamine and dodecylamine phosphate; quaternary ammonium salts such as benzyltriethylammonium acetate; dialkylhydroxylamines such as dimethylhydroxylamine and diethylhydroxylamine; and silanes and siloxanes having a guanidyl group such as tetramethylguanidylpropyltrimethoxysilane, tetramethylguanidylpropylmethyldimethoxysilane, and tetramethylguanidylpropyltris(trimethylsiloxy)silane, but are not limited thereto. Component (C) may be used alone or in admixture.

The curing catalyst may be used in a so-called catalytic amount. The amount of component (C) blended is preferably 0.001 to 10 parts, more preferably 0.005 to 10 parts, and even more preferably 0.01 to 5 parts by weight per 100 parts by weight of the organopolysiloxane (A). Less than 0.001 part of component (C) leads to poor curability, giving rise to problems like deceleration of the cure rate. Inversely, greater than 10 parts of component (C) may provide the composition with undesirably high cure rate, reducing the permissible range of working time after coating of the composition or adversely affecting mechanical properties of the resulting rubber.

Component (F):

Component (F) is a bleed oil and not particularly limited as long as it is a non-reactive (or non-condensation reactive) organopolysiloxane (so-called silicone oil) which does not undergo condensation reaction with diorganopolysiloxane (A), has the backbone of a siloxane skeleton (specifically, a linear diorganopolysiloxane structure composed of repeating difunctional diorganosiloxane units), is a non-functional silicone oil capped with triorganosiloxy at the molecular chain end, and is a silicone oil that bleeds out of the cured product of the inventive composition, that is, silicone rubber (specifically, crosslinked organosiloxane matrix) to the surface of the cured product.

Suitable examples include dimethylsilicone oil in which all silicon-bonded organo groups (i.e., substituted or unsubstituted monovalent hydrocarbon groups) in the diorganosiloxane units of the siloxane skeleton as the backbone are methyl and modified forms of dimethylsilicone oil such as, for example, methylphenylsilicone oil in which some methyl groups are replaced by phenyl groups, amino-modified silicone oil in which some methyl groups are replaced by monoamine, diamine or amino-polyether groups, epoxy-modified silicone oil in which some methyl groups are replaced by epoxy, alicyclic epoxy, epoxy-polyether or epoxy-aralkyl groups, carbinol-modified silicone oil in which some methyl groups are replaced by carbinol groups, mercapto-modified silicone oil in which some methyl groups are replaced by mercapto groups, carboxyl-modified silicone oil in which some methyl groups are replaced by carboxyl groups, methacryl-modified silicone oil in which some methyl groups are replaced by methacrylic groups, polyether-modified silicone oil in which some methyl groups are replaced by polyether groups or polyether, long-chain ($C_6$-$C_{18}$) alkyl and aralkyl groups, long-chain ($C_6$-$C_{18}$) alkyl-modified silicone oil in which some methyl groups are replaced by long-chain ($C_6$-$C_{18}$) alkyl or long-chain ($C_6$-$C_{18}$) alkyl and aralkyl groups, higher fatty acid-modified silicone oil in which some methyl groups are replaced by higher fatty acid ester groups, and fluoroalkyl-modified silicone oil in which some methyl groups are replaced by fluoroalkyl groups. Of these, methylphenylsilicone oil, polyether-modified silicone oil, and long-chain ($C_6$-$C_{18}$) alkyl-modified silicone oil are preferred.

Component (F) preferably has a number average molecular weight (Mn) of 250 to 90,000, more preferably 350 to 40,000, and even more preferably 500 to 10,000, as measured by GPC versus polystyrene standards. Component (F) with a Mn of less than 250 may achieve poor antifouling property whereas component (F) with a Mn in excess of 90,000 may give too viscous compositions which are inconvenient to work.

Component (F) preferably has a viscosity $\mu_{(F)}$ at 25° C. of 20 to 30,000 mPa·s, more preferably 50 to 10,000 mPa·s. Component (F) having a viscosity at 25° C. of less than 20 mPa·s may lead to poor antifouling property whereas component (F) with a viscosity at 25° C. in excess of 30,000 mPa·s may give too viscous compositions which are inconvenient to work and achieve poor antifouling.

The ratio of the viscosity at 25° C. of component (F) to the viscosity at 25° C. of component (A), that is, $\mu_{(F)}/\mu_{(A)}$ is preferably in a range from 0.05 to 1.0, more preferably from 0.06 to 0.95, and even more preferably from 0.08 to 0.80 in view of bleeding, antifouling, and other properties. It is noted that $\mu_{(A)}$ is a viscosity (mPa·s) at 25° C. of component (A).

In the invention, one or multiple members selected from the foregoing silicone oils are used as component (F) in a total amount of 0.01 to 100 parts, preferably 10 to 100 parts by weight per 100 parts by weight of component (A). A composition comprising the silicone oil in an amount within the above range, when used as an antifouling paint, tends to form an (antifouling) coating which is excellent in both antifouling property and coating strength. Outside the range, a less amount of the silicone oil may achieve poor antifouling and a larger amount may lead to a lowering of coating strength.

The inventive composition may further comprise the following components, if necessary.

Component (D):

Component (D) is a filler (inorganic filler and/or organic resin filler), that is, an optional component which may be added if necessary, and used for imparting sufficient mechanical strength to the cured product of the composition. The filler may be any of well-known ones. Examples include reinforcing silica fillers such as finely divided silica, fumed silica, and precipitated silica, and these silica surface-hydrophobized with an organosilicon compound; glass beads; glass balloons; clear resin beads; silica aerogel; diatomaceous earth; metal oxides such as iron oxide, zinc oxide, titanium oxide, and fumed metal oxide; reinforcements such as wet silica, wet silica surface-modified by silane treatment, quartz powder (crystalline silica fine powder), carbon black, talc, zeolite, and bentonite; asbestos; glass fibers; carbon fibers; metal carbonates such as calcium carbonate, magnesium carbonate, and zinc carbonate; asbestos; glass wool; fine powder mica; fused silica powder; and powders of synthetic resins such as polystyrene, polyvinyl chloride, and polypropylene. Of these fillers, inorganic fillers such as silica, calcium carbonate, and zeolite are preferred, with fumed silica being more preferred.

The amount of component (D) blended is 0 to 100 parts by weight per 100 parts by weight of component (A). When used, it is preferably at least 1 part, more preferably 3 to 60 parts by weight. The composition containing more than 100 parts of component (D) may be too viscous to work and may cure into a cured product with a low rubber strength, failing to obtain the desired rubber elasticity.

Component (E):

Component (E) is an adhesion promoter, that is, an optional component which may be added if necessary, and used for imparting sufficient adhesion to the cured product of the composition. The adhesion promoters, that is, silane coupling agents such as functionality-bearing hydrolyzable silanes (called CF silane) having functionality-bearing monovalent hydrocarbon group containing a heteroatom such as oxygen, nitrogen or sulfur and multiple (2 or 3) hydrolyzable groups such as alkoxy per molecule may be any of well-known ones. Examples thereof include (meth)acrylsilane coupling agents, epoxysilane coupling agents, aminosilane coupling agents, and mercaptosilane coupling agents. More specifically, examples include vinyltris(β-methoxyethoxy)silane, γ-methacryloxypropyltrimethoxysilane,β-(3,4-epoxycyclohexyl)ethyltrimethoxysilane, γ-glycidoxypropyltrimethoxysilane, γ-glycidoxypropylmethyldiethoxysilane, γ-mercaptopropyltrimethoxysilane, and isocyanatosilane. Of these, epoxysilanes such as γ-glycidoxypropyltrimethoxysilane and β-(3,4-epoxycyclohexyl)ethyltrimethoxysilane and isocyanatosilane are preferred.

The amount of component (E) blended is 0 to 20 parts by weight per 100 parts by weight of component (A). When used, it is preferably blended in an amount of at least 0.1 part, more preferably 0.1 to 10 parts by weight. The adhesion promoter need not be used when enough adhesion is achieved, depending on the filler and adherend, in the absence of the adhesion promoter.

Other Components:

In addition to the foregoing components, the inventive composition may further comprise additives as long as the objects of the invention are not impaired.

Examples include wetters, thixotropic agents such as polyethers and isoparaffins, and crosslinking density improvers such as network polysiloxanes consisting of trimethylsiloxy units (i.e., $(CH_3)_3SiO_{1/2}$ units) and $SiO_2$ units. If necessary, there may be added colorants such as pigments, dyes and fluorescent brighteners, mildew-proof agents, antifungus agents, and surface modifiers such as silicone-incompatible organic liquids, and solvents such as toluene, xylene, gasoline, cyclohexane, methylcyclohexane and low-boiling isoparaffin.

Well-known additives such as pigments, dyes, antidegradants, antioxidants, antistatic agents, and flame retardants including antimony oxide and chlorinated paraffins may be further added to the RTV organopolysiloxane composition.

[Preparation of RTV Organopolysiloxane Composition]

The RTV organopolysiloxane composition of the invention may be prepared by combining the foregoing components under atmospheric pressure or reduced pressure, preferably a reduced pressure of −0.09 to −0.01 MPa and mixing typically for about 30 minutes to about 3 hours without heating or preferably at a temperature of up to 60° C. When the composition contains a filler as component (D), the composition may be prepared by premixing components (A) and (D) under reduced pressure and mixing for about 30 minutes to about 3 hours while heating, preferably at 80 to 160° C., adding the remaining components under atmospheric pressure or reduced pressure, preferably a reduced pressure of −0.09 to −0.01 MPa, and mixing typically for about 30 minutes to about 3 hours without heating or preferably at a temperature of up to 60° C. In this way, there is obtained a composition which forms a cured coating having improved surface smoothness and which has more viscosity stability over time.

When used as a coating material, paint or especially antifouling paint, the RTV organopolysiloxane composition is excellent in stability during preparation, preservation, and storage and has good curability. Since the resulting coating has a good balance of rubber properties such as hardness, tensile strength and elongation, and also excellent antifouling property, it is advantageously used as an antifouling coating.

The RTV organopolysiloxane composition preferably has a viscosity at 25° C. of 500 to 200,000 mPa·s, more preferably 1,000 to 150,000 mPa·s, which is especially adequate for coating.

Coated substrates may be obtained by coating the RTV organopolysiloxane composition defined above on the surface of various substrates and curing the composition to form a coating layer. The technique of coating the composition is not particularly limited. The coating technique may be selected as appropriate from well-known techniques such as spray coating, spin coating, dip coating, roller coating, brush coating, bar coating, and flow coating.

The inventive RTV organopolysiloxane composition is fully suited in applications as coating materials requiring water resistance such as ship bottom paint, power plant sea water inlet pipe paint, and fishnet paint, moisture-proof coating materials requiring moisture resistance as used for LCD and PDP, adhesive seals between conductor and resin coating, adhesive seals between a resin case or connector and conductor, adhesive seals in vacuum or pressure chambers, and the like. The composition is coated to underwater structures such as ships, harbor facilities, buoys, pipe lines, bridges, submarine stations, submarine oil well excavation units, power plant water conduits, fish culture nets and fixed shore nets as substrates. The cured coating of the composition is non-toxic and non-detrimental to the environment and exhibits the antifouling effect of preventing deposition and growth of aquatic organisms over a long term.

When the RTV organopolysiloxane is applied to underwater structures, the coating weight is not particularly limited. The coating weight is preferably such that the cured coating has a thickness of 10 to 1,000 μm, especially 50 to 500 μm. The RTV organopolysiloxane composition prepared by the method of the invention may be applied and cured at room temperature or normal temperature.

EXAMPLES

Synthesis Examples, Examples and Comparative Examples are given below for further illustrating the invention although the invention is not limited thereto. It is noted that all parts are by weight, the number average molecular weight (Mn) is measured by gel permeation chromatography (GPC) versus polystyrene standards using toluene as developing solvent, and the viscosity is measured at 25° C. by a Brookfield rotational viscometer.

SYNTHESIS EXAMPLE

The method of synthesizing an organopolysiloxane as component (A) is shown below.

Synthesis Example 1

A 200-mL separable flask equipped with a stirrer, reflux condenser, and thermometer was charged with 100 g (0.015 mole as terminal vinyl functionality) of a both end vinyldimethylsiloxy-capped dimethylpolysiloxane having a Mn of 13,600 and 2.6 g (0.015 mole as mercapto functionality) of mercaptomethyltrimethoxysilane and heated at 90° C. Then, 0.1 g of 2,2'-azobis-2-methylbutyronitrile was added to the contents, which were heated and stirred at 90° C. for 3 hours. On $^1$H-NMR analysis, it was confirmed that the peaks assigned to vinyl and mercapto groups on the reactants disappeared completely and instead, the peak assigned to the desired organosilicon compound (i.e., molecular both end β-(trimethoxysilylmethylthio)ethyl-capped dimethylpolysiloxane having the general formula (3) wherein $R^1$=methyl, m=3, n=2, and Z is a linear dimethylpolysiloxane structure) appeared. At the end of reaction, there was obtained Product 1.

Product 1 was a colorless clear liquid having a Mn of 13,900 and a viscosity $\mu_{(A)}$ of 610 mPa·s.

Synthesis Example 2

A 200-mL separable flask equipped with a stirrer, reflux condenser, and thermometer was charged with 100 g (0.012 mole as terminal vinyl functionality) of a molecular both end vinyldimethylsiloxy-capped dimethylpolysiloxane having a Mn of 15,400 and 2.0 g (0.012 mole as mercapto functionality) of mercaptomethyltrimethoxysilane and heated at 90° C. Then, 0.1 g of 2,2'-azobis-2-methylbutyronitrile was added to the contents, which were heated and stirred at 90° C. for 3 hours. On $^1$H-NMR analysis, it was confirmed that the peaks assigned to vinyl and mercapto groups on the reactants disappeared completely and instead, the peak assigned to the desired organosilicon compound (i.e., molecular both end β-(trimethoxysilylmethylthio)ethyl-capped dimethylpolysiloxane having the general formula (3) wherein $R^1$=methyl, m=3, n=2, and Z is a linear dimethylpolysiloxane structure) appeared. At the end of reaction, there was obtained Product 2.

Product 2 was a colorless clear liquid having a Mn of 15,600 and a viscosity $\mu_{(A)}$ of 1,200 mPa·s.

Examples of the RTV organopolysiloxane composition are described below.

Example 1

Product 1 (i.e., molecular both end β-(trimethoxysilylmethylthio)ethyl-capped dimethylpolysiloxane), 90 parts, and 10 parts of surface-untreated fumed silica having a specific surface area of 200 m$^2$/g were intimately premixed and continuously mixed at 150° C. and a reduced pressure of −0.08 MPa for 2 hours. Then, the resulting base was milled one pass on a three-roll mill. Methyltrimethoxysilane, 4.5 parts, 1.5 parts of a hydrolytic condensate of methyltrimethoxysilane (trimer to tetramer on the average), 0.4 part of γ-aminopropyltriethoxysilane and 0.7 part of tetramethylguanidylpropyltrimethoxysilane were added to the base and mixed at a reduced pressure of −0.04 to −0.06 MPa and 20 to 40° C. until uniform. Further, 30 parts of α,ω-trimethylsiloxy-dimethyldiphenylpolysiloxane having a viscosity $\mu_{(F)}$ of 300 mPa·s was added to the mixture and mixed at a reduced pressure of −0.04 to −0.06 MPa and 20 to 40° C. until uniform, yielding Composition 1.

In Composition 1, the viscosity ratio at 25° C. of component (F) to component (A), that is, $\mu_{(F)}/\mu_{(A)}$ was 0.49.

Example 2

Composition 2 was prepared as in Example 1 aside from using 0.4 part of 3-(2-aminoethylamino)propyltrimethoxysilane instead of γ-aminopropyltriethoxysilane in Example 1.

Example 3

Product 2 (i.e., molecular both end β-(trimethoxysilylmethylthio)ethyl-capped dimethylpolysiloxane), 90 parts, and 10 parts of surface-untreated fumed silica having a specific surface area of 200 m²/g were intimately premixed and continuously mixed at 150° C. and a reduced pressure of −0.08 MPa for 2 hours. Thereafter, the resulting base was milled one pass on a three-roll mill. Methyltrimethoxysilane, 4.5 parts, 1.5 parts of a hydrolytic condensate of methyltrimethoxysilane (trimer to tetramer on the average), 0.4 part of γ-aminopropyltriethoxysilane and 0.7 part of tetramethylguanidylpropyltrimethoxysilane were added to the base and mixed at a reduced pressure of −0.04 to −0.06 MPa and 20 to 40° C. until uniform. Further, 30 parts of α,ω-trimethylsiloxy-dimethyldiphenylpolysiloxane having a viscosity $\mu_{(F)}$ of 300 mPa·s was added to the mixture and mixed at a reduced pressure of −0.04 to −0.06 MPa and 20 to 40° C. until uniform, yielding Composition 3.

In Composition 3, the viscosity ratio at 25° C. of component (F) to component (A), that is, $\mu_{(F)}/\mu_{(A)}$ was 0.25.

Example 4

Composition 4 was prepared as in Example 3 aside from using 0.4 part of 3-(2-aminoethylamino)propyltrimethoxysilane instead of γ-aminopropyltriethoxysilane in Example 3.

Example 5

Product 1 (i.e., molecular both end β-(trimethoxysilylmethylthio)ethyl-capped dimethylpolysiloxane), 90 parts, and 10 parts of surface-untreated fumed silica having a specific surface area of 200 m²/g were intimately premixed and continuously mixed at 150° C. and a reduced pressure of −0.08 MPa for 2 hours. Then, the resulting base was milled one pass on a three-roll mill. Methyltrimethoxysilane, 4.5 parts, 1.5 parts of a hydrolytic condensate of methyltrimethoxysilane (trimer to tetramer on the average), 0.4 part of γ-aminopropyltriethoxysilane and 0.7 part of tetramethylguanidylpropyltrimethoxysilane were added to the base and mixed at a reduced pressure of −0.04 to −0.06 MPa and 20 to 40° C. until uniform. Further, 30 parts of polyether-modified polysiloxane (X-22-2516, Shin-Etsu Chemical Co., Ltd) having a viscosity $\mu_{(F)}$ of 60 mPa·s was added to the mixture and mixed at a reduced pressure of −0.04 to −0.06 MPa and 20 to 40° C. until uniform, yielding Composition 5.

In Composition 5, the viscosity ratio at 25° C. of component (F) to component (A), that is, $\mu_{(F)}/\mu_{(A)}$ was 0.098.

Example 6

Composition 6 was prepared as in Example 5 aside from using 0.4 part of 3-(2-aminoethylamino)propyltrimethoxysilane instead of γ-aminopropyltriethoxysilane in Example 5.

Comparative Example 1

Composition 7 was prepared as in Example 1 aside from omitting 30 parts of α,ω-trimethylsiloxy-dimethyldiphenylpolysiloxane having a viscosity of 300 mPa·s from the composition of Example 1.

Comparative Example 2

Composition 8 was prepared as in Example 1 aside from using a molecular both end trimethoxysilyl-capped polydimethylsiloxane having a viscosity of 900 mPa·s at 25° C. instead of Product 1 (i.e., molecular both end β-(trimethoxysilylmethylthio)ethyl-capped dimethylpolysiloxane) in Example 1.

Comparative Example 3

A molecular both end trimethoxysilyl-capped polydimethylsiloxane having a viscosity of 900 mPa·s at 25° C., 90 parts, and 10 parts of surface-untreated fumed silica having a specific surface area of 200 m²/g were intimately premixed and continuously mixed at 150° C. and a reduced pressure of −0.08 MPa for 2 hours. Thereafter, the resulting base was milled one pass on a three-roll mill. Methyltrimethoxysilane, 4.5 parts, 1.5 parts of a hydrolytic condensate of methyltrimethoxysilane (trimer to tetramer on the average), 0.4 part of γ-aminopropyltriethoxysilane and 2 parts of titanium isopropoxybis(ethylacetoacetate) were added and mixed at a reduced pressure of −0.04 to −0.06 MPa and 20 to 40° C. until uniform. Further, 30 parts of a,w-trimethylsiloxy-dimethyldiphenylpolysiloxane having a viscosity of 300 mPa·s was added to the mixture and mixed at a reduced pressure of −0.04 to −0.06 MPa and 20 to 40° C. until uniform, yielding Composition 9.

<Performance Tests>

The compositions thus obtained were tested for various performance factors according to the following test procedures.

[Test Procedure]
(A) Curability Test

A tack-free time at a coating thickness of 200 μm was measured according to JIS K 6249.

(B) Cured Physical Properties

A composition was molded into a sheet of 2 mm thick and cured at 23° C. and 50% RH for 7 days. Rubber physical properties (hardness, elongation, and tensile strength) of the sheet were measured according to JIS K 6249.

(C) Coating Efficiency

Test solutions of compositions 1 to 9 were prepared by mixing 90 g of each composition with 10 g of xylene. A mild steel plate of 100 mm×100 mm×1 mm (thick) was attached to the center of a tin plate of 1,000 mm×1,000 mm×1 mm (thick). With the tin plate kept upright, the test solution was applied by airless spraying. It was visually observed whether or not the spray nozzle was clogged (i.e., Sprayability). The critical thickness of a coating above which sagging occurred was determined after drying.

(D) Antifouling

An epoxy base anti-corrosion paint was previously coated onto plates to a thickness of 200 μm. Compositions 1 to 9 were coated thereon, yielding coated test plates or specimens. The specimens were kept at 23° C. and 50% RH for 7 days for curing the composition to form a coating of 200 μm thick. In a suspension test, the specimens after curing were suspended at a depth of 1.5 m in seawater offshore Kanagawa over 24 months. The deposition of sea organisms including shells (e.g., barnacle) and seaweed on the specimens was observed after 3, 6, 12, and 24 months.

(E) Stability of Coating Composition

A coating composition as prepared was held in a sealed container at 23° C. for 6 months, after which it was examined for its state (shelf stability) and coating efficiency. The composition state (shelf stability) was examined by visual observation and also by opening the container, stirring the composition, and measuring by a grindometer. The coating efficiency was examined by the same test as above.

(F) Adhesion

An epoxy base anti-corrosion paint was previously coated onto plates to a thickness of 200 μm. Compositions 1 to 9 were coated thereon to a thickness of 200 μm, completing test specimens. After the specimen was allowed to stand for a certain time after coating, it was cut with a utility knife deep enough to reach the anti-corrosion paint. The coating was evaluated for adhesion by rubbing strongly with a finger in a direction perpendicular to the cut. The coating was rated good "0" when the coating was not stripped and poor "X" when the coating was stripped.

The test results are shown in Tables 1 and 2.

TABLE 1

| | | Example | | | | | |
|---|---|---|---|---|---|---|---|
| | | 1 | 2 | 3 | 4 | 5 | 6 |
| Curability test | Tack-free time (min) | 12 | 15 | 16 | 18 | 18 | 19 |
| Cured physical properties | Hardness, Type-A | 35 | 33 | 34 | 31 | 35 | 32 |
| | Elongation (%) | 90 | 100 | 130 | 130 | 140 | 150 |
| | Tensile strength (MPa) | 1.1 | 1.0 | 1.3 | 1.2 | 1.4 | 1.4 |
| Coating efficiency | Sprayability | good | good | good | good | good | good |
| | Critical thickness (μm) | 150 | 150 | 150 | 150 | 150 | 100 |
| Antifouling | 3 months | no deposits | no deposits | no deposits | no deposits | no deposits | no deposits |
| | 6 months | no deposits | very slight deposits | no deposits | very slight deposits | no deposits | very slight deposits |
| | 12 months | slight deposits | slight deposits | slight deposits | slight deposits | slight deposits | slight deposits |
| | 24 months | slight deposits | slight deposits | slight deposits | slight deposits | slight deposits | slight deposits |
| Coating composition stability | Composition state | good | good | good | good | good | good |
| | Sprayability | good | good | good | good | good | good |
| | Critical thickness (μm) | 150 | 150 | 150 | 150 | 150 | 100 |
| Adhesion | 30 minutes | ○ | ○ | ○ | ○ | ○ | ○ |
| | 60 minutes | ○ | ○ | ○ | ○ | ○ | ○ |
| | 90 minutes | ○ | ○ | ○ | ○ | ○ | ○ |

TABLE 2

| | | Comparative Example | | |
|---|---|---|---|---|
| | | 1 | 2 | 3 |
| Curability test | Tack-free time (min) | 8 | 60 | 15 |
| Cured physical properties | Hardness, Type-A | 45 | 32 | 33 |
| | Elongation (%) | 60 | 80 | 90 |
| | Tensile strength (MPa) | 1.4 | 1.1 | 1.2 |
| Coating efficiency | Sprayability | good | good | good |
| | Critical thickness (μm) | 100 | 150 | 150 |
| Antifouling | 3 months | much deposits | no deposits | no deposits |
| | 6 months | much deposits | very slight deposits | slight deposits |
| | 12 months | much deposits | slight deposits | slight deposits |
| | 24 months | much deposits | slight deposits | much deposits |
| Coating composition stability | Composition state | good | good | good |
| | Sprayability | good | good | good |
| | Critical thickness (μm) | 150 | 150 | 150 |
| Adhesion | 30 minutes | ○ | X | X |
| | 60 minutes | ○ | X | X |
| | 90 minutes | ○ | X | X |

While the invention has been illustrated and described in the above embodiments, it is not intended to be limited to the details shown. Various other embodiments having additions, modifications, and eliminations may occur to persons skilled in the art using no more than routine experimentation. Any embodiments exerting equivalent functions and results are believed to be within the spirit and scope of the invention.

INDUSTRIAL APPLICABILITY

The inventive composition is an environment-friendly composition containing neither organotin compounds nor MEKO. Since the composition is good in curability and forms a coating which has coating strength, coating hardness, rubber properties, water resistance, and moisture resistance, it is highly suited in applications as coating materials requiring water resistance such as ship bottom paint, power plant sea water inlet pipe paint, and fishnet paint, moisture-proof coating materials requiring moisture resistance as used for LCD and PDP, adhesive seals between conductor and resin coating, adhesive seals between a resin case or connector and conductor, adhesive seals in vacuum or pressure chambers, and the like. Particularly when used as ship bottom paint, power plant sea water inlet pipe paint, and fishnet paint, the composition is effective for preventing deposition and growth of aquatic organisms on the corresponding surface.

The invention claimed is:

1. A room temperature vulcanizable organopolysiloxane composition comprising the following components (A), (B), (C) and (F):

(A) 100 parts by weight of an organopolysiloxane having, at the end of the molecular chain, a hydrolyzable silyl-containing monovalent organic group represented by the general formula (1):

[Chem. 1]

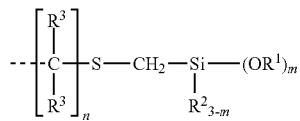

(1)

wherein $R^1$ is each independently a substituted or unsubstituted $C_1$-$C_{10}$ alkyl group or a substituted or unsubstituted $C_6$-$C_{10}$ aryl group, $R^2$ is each independently a substituted or unsubstituted $C_1$-$C_{10}$ alkyl group or a substituted or unsubstituted $C_6$-$C_{10}$ aryl group, $R^3$ which may be the same or different is a substituted or unsubstituted $C_1$-$C_{20}$ alkyl group or hydrogen, m is an integer of 1 to 3, n is an integer of at least 2, and the broken line represents a valence bond, (B) 0.1 to 30 parts by weight of a hydrolyzable (organo) silane compound having the general formula (2) and/or a partial hydrolytic condensate thereof,

[Chem. 2]

(2)

wherein $R^5$ is a halo-substituted or unsubstituted $C_1$-$C_{10}$ monovalent hydrocarbon group, X is a hydrolyzable group, and a is 3 or 4, (C) 0.001 to 10 parts by weight of a curing catalyst, and (F) 0.01 to 100 parts by weight of a bleed oil.

2. The room temperature vulcanizable organopolysiloxane composition of claim 1 wherein component (A) has the structural formula (3):

[Chem. 3]

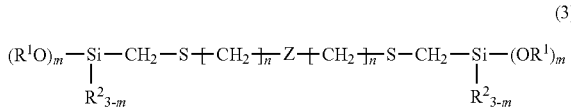

(3)

wherein $R^1$, $R^2$, m and n are as defined above and Z is an organopolysiloxane skeleton of linear, branched, cyclic and/or crosslinked structure as the backbone.

3. The room temperature vulcanizable organopolysiloxane composition of claim 1 or 2 wherein component (A) has a viscosity $\mu_{(A)}$ of 100 to 100,000 mPa·s at 25° C.

4. The room temperature vulcanizable organopolysiloxane composition of claim 1 wherein component (F) has a viscosity $\mu_{(F)}$ of 20 to 30,000 mPa·s at 25° C.

5. The room temperature vulcanizable organopolysiloxane composition of claim 1 wherein a ratio of the viscosity at 25° C. of component (F) to the viscosity at 25° C. of component (A), that is, $\mu_{(F)}/\mu_{(A)}$ is from 0.05 to 1.0.

6. The room temperature vulcanizable organopolysiloxane composition of claim 1, further comprising at least one component selected from (D) 1 to 100 parts by weight of a filler and (E) 0.1 to 10 parts by weight of an adhesion promoter.

7. A substrate which is coated with a cured product of the room temperature vulcanizable organopolysiloxane composition of claim 1.

8. The substrate of claim 7 which is an underwater structure.

* * * * *